E. L. JONES.
WATER METER.
APPLICATION FILED MAY 21, 1920.

1,412,408.

Patented Apr. 11, 1922.

WITNESSES

INVENTOR
E.L. Jones.

ATTORNEY

UNITED STATES PATENT OFFICE.

ELLIS L. JONES, OF LONG ISLAND CITY, NEW YORK.

WATER METER.

1,412,408.   Specification of Letters Patent.   Patented Apr. 11, 1922.

Application filed May 21, 1920. Serial No. 383,265.

*To all whom it may concern:*

Be it known that I, ELLIS L. JONES, a citizen of the United States, and resident of Long Island City, in the county of Queens and State of New York, have invented certain new and useful Improvements in Water Meters, of which the following is a specification.

This invention relates to improvements in intermediate or reduction gear trains, especially adapted for use in liquid meters and of what is known as the differential bevel gear type.

One of the objects is to provide a train of gearing of the type and for the purpose mentioned in which as many friction producing points as possible are eliminated so as to ensure accuracy, durability, and the proper functioning of the meter as a measuring device.

Another object is to combine in a single gear member the functions of a plurality of gear members.

A further object is to provide simple and extremely efficient means for holding the various gears in their proper relation to each other.

A still further object is to provide means whereby the change gears may be forced on the actuating shaft or spindle after the same has been assembled in the device and without disarranging any of the parts previously assembled.

Another object is to produce a device which may be rapidly and easily assembled.

Another object is to provide a suitable thrust bearing on the operating shaft or spindle.

A further object is to provide a structure which shall be frost proof so constructed that if the liquid freezes in the meter, the teeth of the gears can separate and nothing will be broken except the clamping members which are easily replaceable.

Other objects will appear from the following description and claims, all of which objects tend to increase the stability, durability, accuracy and efficiency of liquid meters.

All of these objects are accomplished by mechanism illustrated in the accompanying drawings, in which:—

Like characters of reference refer to like parts in the several views.

Figure 1:
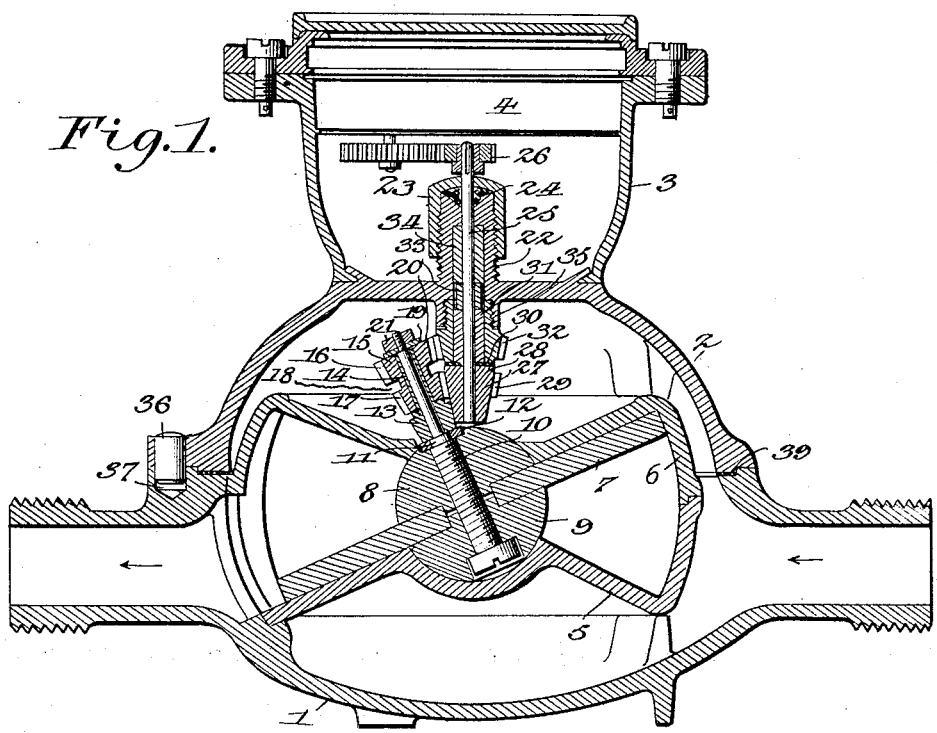
Figure 1 is a top plan view of my improved liquid meter.
Figure 2:
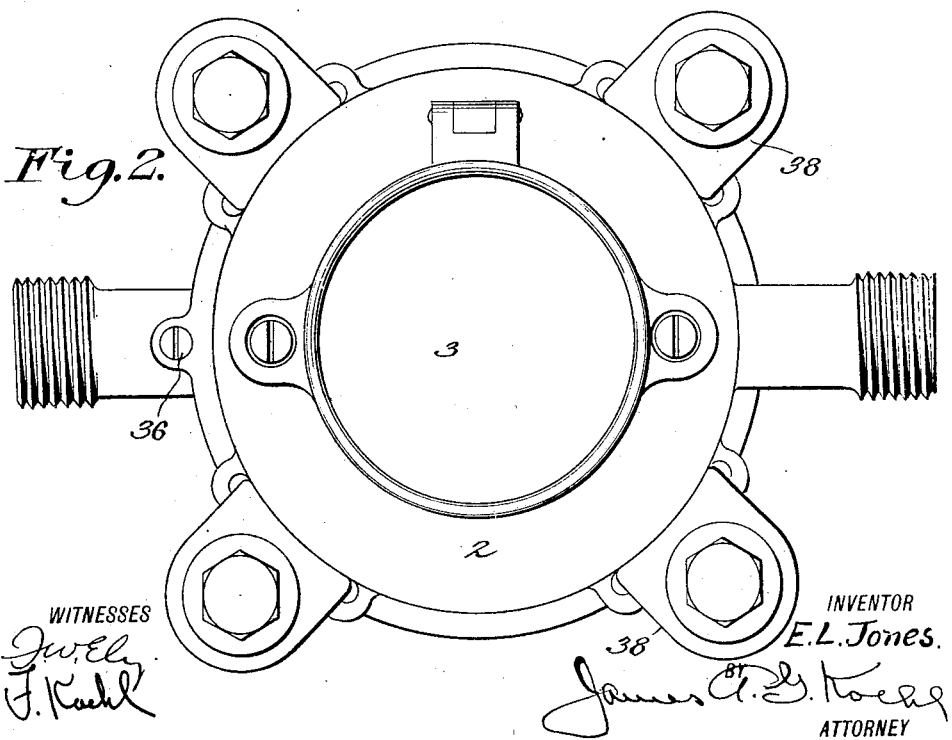
Figure 2 is a side elevation of the same.

The invention sought to be covered in the present application is confined to the arrangement and construction of the train of gearing from the piston to the register, the measuring chamber being covered in another application.

Referring more particularly to the drawings, 1 represents the lower portion and 2 the upper portion of the main casing of the meter. An upstanding frame or housing 3 is supported by the portion 2, and supports the registering mechanism per se, which is conventionally represented at 4.

A measuring chamber is formed by lower and upper members 5 and 6 which are clamped between members 1 and 2. In the measuring chamber is seated a piston comprising a disk member 7 seated between two substantially hemi-spherical members 8 and 9, the members 8 and 9 having bearings in the lower and upper measuring chamber members 5 and 6, respectively.

In operation, when liquid is admitted to the meter casing, it enters and passes around in the measuring chamber thereby causing the piston to nutate. It is the object of the present invention to change these nutations into rotary motion in the most effective manner.

Seated in the piston and projecting thereabove through the upper member 6 of the measuring chamber is what I shall term an operating shaft or spindle 10, the term "operating" being used to distinguish from an "actuating" shaft to be hereinafter described as operated by spindle 10 to actuate the register 4. The spindle 10 is secured in the piston 10 by screw threads formed on said spindle. At the end of the threaded portion of the spindle 10 there is formed a lug 11 which is adapted to fit into a corresponding aperture in a washer 12 and prevent rotation of said washer on the spindle. Washer 12 forms a thrust bearing for a member comprising a controlling conical portion 13 and a bushing or sleeve portion 14, the member 13—14 being placed on spindle 10 with the truncated end of the conical portion 13 seated against the thrust bearing 12. Upon the sleeve or bushing portion 12 is seated a member 15 comprising two sets of bevel gear teeth 16 and 17 intervened by a space 18. A washer 19 is seated against a shoulder 20 on spindle 10 and secured in place by a nut 21, so that the member 13—14 is free to rotate upon spindle 10 and member 15 is free to rotate upon sleeve portion 14.

A boss 22 is formed on the upper surface of the member 2 and provided at its upper end with a cap 23 so as to form a stuffing box at 24. Mounted in this boss is what I shall term an actuating shaft or spindle 25, it being provided with a gear 26 at its upper end which is adapted to actuate the register 4.

Secured to the lower end of the spindle 25 is a member 27 comprising a conical portion 28 adapted to co-act with the conical portion 13 of member 13—14, and also comprising a bevel gear portion 29 adapted to engage the teeth 17 of member 15. A thrust washer 30 is mounted on spindle 25 above member 27, and above said washer is a sleeve or bushing 31 which is free on the spindle but held against movement by a bevel gear member 32 so as to form a bearing for said spindle 25. A collar 33 secured to spindle 25 above bushing 31 secures the spindle against lateral movement, and a bushing 34 forms an upper bearing for spindle 25.

In assembling the parts, the shaft is first assembled with members 27, 30, 31, 32 and 33; then bushing 34 is inserted in the boss 22 and shaft 25 is inserted, member 32 being screwed into a downwardly facing boss 35 on member 2. This holds the shaft securely in place while the register-actuating gear 26 is thrust onto the upper end of the shaft or spindle.

It will be obvious that the nutating movement of the piston will cause spindle 10 to move with a conical sweep about the lower end of spindle 25. This causes the teeth 16 which are in engagement with member 32 to walk about the latter thereby causing rotation of the member 15 which causes teeth 17 to rotate member 27 and spindle 25 which effects registration through the gear 26.

The members 1 and 2 are brought into proper register by means of a dowel pin and hole 36 and 37, and are clamped securely together by clamps 38 which are made of suitable strength to hold the parts 1 and 2 securely against each other and against a gasket 39 under normal conditions; but so that if the meter freezes, the clamps will break in preference to the body portions. It will be readily seen that the spaces between the gears on shafts 25 and 10 furnish room for the disengagement of the teeth in mesh in each case, which disengagement would result upon freezing, and this contributes to the efficiency of the meter as a frost proof device, for the space between the gears is greater than the depth of the gasket seat which permits a separation of members 1 and 2 without damage to the parts other than the breaking of clamps 38.

While I have described what I consider to be the most desirable embodiment of my invention, it is obvious that many of the details are susceptible of variation without in any way departing from the spirit of my invention; and I therefore do not limit myself to the exact details herein shown. Now having described my invention, what I claim as new and desire to secure by Letters-Patent is:—

1. In a device of the class described, the combination of a nutatable piston, a spindle comprising a threaded portion whereby it may be secured in said piston, a lug in contiguity to said threaded portion, and a bearing portion in contiguity to said lug; a thrust bearing secured to said spindle by said lug; a controlling member bearing against said thrust bearing; a gear operatively related to said controlling member; a register; and a rotatable spindle adapted to be operated by said gear upon nutating said piston.

2. In a device of the class described, the combination of a frame member provided with a hollow boss, a bearing sleeve seated in the hollow in said boss, a second bearing sleeve, a gear member adapted to be stationarily seated in said boss and to support said second bearing sleeve, a shaft rotatably supported by said sleeves, and a collar secured to said shaft intermediate said bearing sleeves for preventing lengthwise movement of said shaft.

Signed at New York, in the county of New York and State of New York this 7th day of May, A. D. 1920.

ELLIS L. JONES.